United States Patent
Wang et al.

(10) Patent No.: US 9,443,349 B2
(45) Date of Patent: Sep. 13, 2016

(54) ELECTRONIC APPARATUS AND METHOD FOR INCREMENTAL POSE ESTIMATION AND PHOTOGRAPHING THEREOF

(71) Applicant: Industrial Technology Research Institute, Hsinchu (TW)

(72) Inventors: Te-Mei Wang, Hsinchu (TW); Chen-Hao Wei, Kaohsiung (TW); Hsiao-Wei Chen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/576,163

(22) Filed: Dec. 18, 2014

(65) Prior Publication Data

US 2016/0163091 A1 Jun. 9, 2016

(30) Foreign Application Priority Data

Dec. 9, 2014 (TW) .............. 103142812 A (51) Int. Cl.
   *G06K 9/00* (2006.01)
   *G06T 15/20* (2011.01)
   *G06T 17/10* (2006.01)
   (Continued)

(52) U.S. Cl.
   CPC .............. *G06T 15/20* (2013.01); *G06T 5/002* (2013.01); *G06T 7/0042* (2013.01); *G06T 7/2073* (2013.01); *G06T 7/2086* (2013.01); *G06T 17/05* (2013.01); *G06T 17/10* (2013.01); *G06T 19/20* (2013.01); *H04N 9/045* (2013.01); *G06T 2200/04* (2013.01); *G06T 2200/08* (2013.01); *G06T 2200/21* (2013.01); *G06T 2207/10004* (2013.01); *G06T 2207/10032* (2013.01); *G06T 2207/20182* (2013.01);
   (Continued)

(58) Field of Classification Search
   None
   See application file for complete search history.

(56) References Cited

U.S. PATENT DOCUMENTS 7,860,651 B2 12/2010 Morgan et al.
8,532,367 B2 9/2013 Kaganovich
(Continued)

FOREIGN PATENT DOCUMENTS

CN 102395997 3/2012
EP 2685707 1/2014
(Continued)

OTHER PUBLICATIONS

"Office Action of Taiwan Counterpart Application", issued on Oct. 12, 2015, p. 1-p. 3.
(Continued)

*Primary Examiner* — Nancy Bitar
(74) *Attorney, Agent, or Firm* — Jianq Chyun IP Office (57) ABSTRACT

An electronic apparatus and a method for incremental pose estimation and photographing are provided. In the method, at least two images of a 3D object are captured at different positions encircling the 3D object. Displacements and angular displacements are detected when capturing the images. Features of the 3D object in the images, the displacements and the angular displacements are used to estimate a central position of the 3D object and a distance between the electronic apparatus and the 3D object. A circumference suitable for capturing the images of the 3D object is estimated based on the distance and is divided into several segments, and a timing interval of a timer is adjusted based on a length of the segments. A camera of the electronic apparatus is triggered at intervals set by the timer to capture the images of the 3D object.

20 Claims, 8 Drawing Sheets

(51) Int. Cl.
*G06T 17/05* (2011.01)
*G06T 19/20* (2011.01)
*G06T 5/00* (2006.01)
*G06T 7/00* (2006.01)
*H04N 9/04* (2006.01)
*G06T 7/20* (2006.01)

(52) U.S. Cl.
CPC ............ *G06T 2207/30181* (2013.01); *G06T 2207/30244* (2013.01); *G06T 2210/61* (2013.01)

(56) References Cited

U.S. PATENT DOCUMENTS

| 8,620,095 | B2 | 12/2013 | Sinha et al. | |
|---|---|---|---|---|
| 8,676,498 | B2 | 3/2014 | Ma et al. | |
| 2006/0006309 | A1 | 1/2006 | Dimsdale et al. | |
| 2006/0221072 | A1* | 10/2006 | Se | G01C 11/06 345/420 |
| 2012/0191287 | A1* | 7/2012 | Shin | G05D 1/027 701/28 |
| 2013/0044184 | A1* | 2/2013 | Sophrin | H04N 9/3185 348/43 |
| 2013/0335562 | A1 | 12/2013 | Ramanandan et al. | |
| 2014/0098242 | A1 | 4/2014 | Sharma et al. | |
| 2014/0285818 | A1 | 9/2014 | Holz | |
| 2015/0055821 | A1* | 2/2015 | Fotland | G06K 9/3241 382/103 |

FOREIGN PATENT DOCUMENTS

TW 201118791 6/2011
WO 2008034942 3/2008

OTHER PUBLICATIONS

Irschara et al., "Efficient Structure from Motion with Weak Position and Orientation Priors," 2011 IEEE Computer Society Conference on Computer Vision and Pattern Recognition Workshops (CVPRW), Jun. 20-25, 2011, pp. 21-28.
Agostino Martinelli, "Closed-Form Solution of Visual-Inertial Structure from Motion," International Journal of Computer Vision, Aug. 9, 2013, pp. 138-152.
Ramachandran et al., "A Fast Bilinear Structure from Motion Algorithm Using a Video Sequence and Inertial Sensors," IEEE Transactions on Pattern Analysis and Machine Intelligence, Jan. 2011, pp. 186-193.
Ababsa et al., "Hybrid three-dimensional camera pose estimation using particle filter sensor fusion," Advanced Robotics, Jan. 2007, pp. 165-181.
Qian et al., "Robust structure from motion estimation using inertial data," Journal of the Optical Society of America A: Optics, Image Science, and Vision, Dec. 2001, pp. 2982-2997.

* cited by examiner

FIG. 1

| Capture at least two images of a three-dimensional (3D) object at different positions encircling the 3D object by the image capturing unit, and detect displacements and angular displacements of the electronic apparatus by the sensing unit | ~S220 |

| Calculate a circumference suitable for capturing the images of the 3D object according to a central position of the 3D object and a distance between the 3D object and the electronic apparatus estimated from a plurality of features of the 3D object in the images, the displacements and the angular displacements | ~S240 |

| Divide the estimated circumference into a plurality of segments, and adjust a timing interval of a timer according to a length of the segments | ~S260 |

| Trigger the image capturing unit at the timing intervals set by the timer to capture the images of the 3D object | ~S280 |

ELECTRONIC APPARATUS AND METHOD FOR INCREMENTAL POSE ESTIMATION AND PHOTOGRAPHING THEREOF

CROSS-REFERENCE TO RELATED APPLICATION

This application claims the priority benefit of Taiwan application serial no. 103142812, filed on Dec. 9, 2014. The entirety of the above-mentioned patent application is hereby incorporated by reference herein and made a part of this specification.

BACKGROUND

1. Technical Field

The disclosure relates to a method and an apparatus for photographing, and particularly relates to an electronic apparatus and a method for incremental pose estimation and photographing thereof.

2. Related Art

Camera pose estimation is an important step to reconstruct a three-dimensional (3D) object by a monocular camera. Although a certain reconstruction quality can be achieved by purely processing captured images, considerable computation resources are required in matching all feature points among all images. Many images are dropped during feature matching process due to noise disturbance, usually the insufficient images results in an unsatisfied partial reconstruction of the 3D object.

In most prior arts, such as aerial photogrammetry or unmanned aerial vehicle, integrated global positioning system (GPS) and inertial measurement unit (IMU) sensors are used to assist feature matching process. However, the solutions for large-scale measurement are not suitable for small-scale measurement on a handheld device. Since data measured by the handheld device is less stable than data measured by fixed sensors on vehicles, errors are more liable to be amplified in small-scale measurement. It is necessary to provide a photographing method to refine biased sensor data and utilize more unordered images to reconstruct a complete 3D object.

SUMMARY

The disclosure is related to an electronic apparatus and a method for incremental pose estimation and photographing thereof, in which by estimating a circumference for a three-dimensional (3D) object, a timing interval is adjusted to automatically trigger the electronic apparatus to capture the images of the 3D object at suitable time.

The disclosure provides a method for incremental pose estimation and photographing, which is adapted for an electronic apparatus having an image capturing unit, a sensing unit and a timer. In the method, at least two images of a 3D object are captured at different positions encircling the 3D object by the image capturing unit. Displacements and angular displacements of the electronic apparatus are detected by the sensing unit when capturing the images. A circumference suitable for the electronic apparatus to capture the images of the 3D object is calculated according to a central position of the 3D object and a distance between the 3D object and the electronic apparatus estimated from a plurality of features of the 3D object in the images, the displacements and the angular displacements. The estimated circumference is divided into a plurality of segments, and a timing interval of a timer is adjusted according to a length of the segments. Finally, the image capturing unit is triggered at the timing intervals set by the timer to capture the images of the 3D object.

In an embodiment of the disclosure, after the step of triggering the image capturing unit at intervals set by the timer to capture the images of the 3D object, the method further includes following steps. First, the central position of the 3D object is re-estimated whenever a new image is added. Then, whether a difference between the re-estimated central position and the originally estimated central position exceeds a predetermined ratio is examined. If the difference exceeds the predetermined ratio, the circumference and the timing interval of the timer are adjusted according to the re-estimated central position.

In an embodiment of the disclosure, after the step of triggering the image capturing unit at the timing intervals set by the timer to capture the image of the 3D object, the method further includes following steps. First, the circumference of the 3D object are re-estimated whenever a new image is added. Then, whether a difference between the re-estimated circumference and the originally estimated circumference exceeds a predetermined ratio is examined. If the difference exceeds the predetermined ratio, the timing interval of the timer is adjusted according to the re-estimated circumference.

In an embodiment of the disclosure, after the step of capturing the images of the 3D object at different positions encircling the 3D object by the image capturing unit, and detecting the displacements and the angular displacements of the electronic apparatus by the sensing unit, the method further includes following steps. A first photographing pose of the electronic apparatus is estimated according to the displacement and the angular displacement of the electronic apparatus detected by the sensing unit when capturing each image. Then, a second photographing pose of the electronic apparatus is estimated and an overlap between the images is calculated by matching a plurality of features between the images. Finally, the images and corresponding pose tracking information are respectively recorded into a plurality of nodes in a linked list, where the pose tracking information includes the first photographing pose, the second photographing pose, a tolerance of the photographing poses and the overlap between the images.

In an embodiment of the disclosure, the step of estimating the photographing pose of the electronic apparatus includes following steps. Each move of the electronic apparatus is divided into a plurality of small moves, and a small displacement and a small angular displacement detected by the sensing unit in each small move of the electronic apparatus are retrieved. Moreover, the small displacement and the small angular displacement detected by the sensing unit in each small move are integrated to estimate a moving path of the electronic apparatus in a 3D space and the photographing pose of the electronic apparatus when capturing each image.

In an embodiment of the disclosure, after the step of respectively recording the images and corresponding pose tracking information into the nodes in the linked list, the method further includes following steps. A plurality of images with the closest pose tracking information are found from the linked list whenever the electronic apparatus captures a new image of the 3D object by the image capturing unit, and a node is added to the linked list to insert the new image and corresponding pose tracking information between the images or in front of or behind one of the images.

In an embodiment of the disclosure, after the step of estimating the circumference suitable for the electronic apparatus to capture the images of the 3D object, the method further includes following steps. A surface enclosing the 3D object is created according to the circumference, and the images captured by the electronic apparatus are respectively projected onto the surface to identify a plurality of covered regions and a plurality of uncovered regions on the surface. Then, the uncovered region with the shortest distance on the surface is searched according to a present position of the electronic apparatus, and a photographing position used for capturing a new image of the uncovered region is estimated. Finally, a moving direction and a moving distance of the electronic apparatus moving from the present position to the photographing position are calculated, and the moving direction and the moving distance are prompted on a user interface of the electronic apparatus.

In an embodiment of the disclosure, the step of identifying the covered regions and the uncovered regions on the surface include respectively projecting four corners of each image captured by the electronic apparatus onto the surface to identify the covered regions and the uncovered regions on the surface.

In an embodiment of the disclosure, after the step of prompting the moving direction and the moving distance on the user interface of the electronic apparatus, the method further includes following steps. The new image of the uncovered region is captured by the image capturing unit, and a new central position of the 3D object and a new distance between the 3D object and the electronic apparatus are re-estimated by re-analyzing the images and the new image. Then, the surface enclosing the 3D object is adjusted to a new surface according to the new central position and the new distance. Finally, the images captured by the electronic apparatus are re-projected onto the new surface to identify the covered regions and the uncovered regions on the new surface.

In an embodiment of the disclosure, the step of estimating the photographing position used for capturing the new image of the uncovered region includes estimating the photographing position for capturing the new image of the uncovered region to have an overlap of a predetermined ratio between the captured new image and the previously captured image.

In an embodiment of the disclosure, the step of estimating the circumference suitable for the electronic apparatus to capture the images of the 3D object includes following steps. A plurality of circumferences suitable for the electronic apparatus to capture the images of the 3D object are estimated to form a spherical surface enclosing the 3D object. The circumferences are divided into the segments for adjusting the timing interval of the timer.

In an embodiment of the disclosure, the step of dividing the estimated circumference into a plurality of the segments and adjusting the timing interval of the timer according to the length of the segments includes dividing the estimated circumference into the segments according to a displacement of the electronic apparatus when capturing the images.

The disclosure provides an electronic apparatus including an image capturing unit, a sensing unit, a timer and a calculation unit. The image capturing unit is used for capturing images of a 3D object at different positions encircling the 3D object. The sensing unit detects displacements and angular displacements of the electronic apparatus when the image capturing unit captures the images. The timer triggers the image capturing unit to capture the images of the 3D object at timing intervals. The calculation unit is coupled to the image capturing unit, the sensing unit and the timer, and executes a plurality of modules. The modules include a circumference estimation module and a timer setting module. The circumference estimating module estimates a circumference suitable for the electronic apparatus to capture the images of the 3D object according to a central position of the 3D object and a distance between the 3D object and the electronic apparatus estimated from a plurality of features of the 3D object in the images, the displacements and the angular displacements detected by the sensing unit. The timer setting module divides the circumference estimated by the circumference estimating module into a plurality of segments, and adjusts the timing interval of the timer according to a length of the segments.

In an embodiment of the disclosure, after the timer triggers the image capturing unit to capture a new image of the 3D object according to the adjusted timing interval, the circumference estimating module re-estimates the central position of the 3D object. The timer setting module adjusts the timing interval of the timer according to the re-estimated the central position if a difference between the re-estimated central position and the originally estimated central position exceeds a predetermined ratio.

In an embodiment of the disclosure, after the timer triggers the image capturing unit to capture a new image of the 3D object according to the adjusted timing interval, the circumference estimating module further re-estimates the circumference of the 3D object, and the timer setting module adjusts the timing interval of the timer according to the re-estimated circumference if a difference between the re-estimated circumference and the originally estimated circumference exceeds a predetermined ratio.

In an embodiment of the disclosure, the modules further include a feature matching module, a pose estimation module and a pose tracking module. The feature matching module extracts and matches a plurality of features in the images. The pose estimation module estimates a first photographing pose of the electronic apparatus according to the displacement and the angular displacement of the electronic apparatus detected by the sensing unit when capturing each image, and estimates a second photographing pose of the electronic apparatus according to the features matched by the feature matching module. The pose tracking module respectively records the images and corresponding pose tracking information into a plurality of nodes in a linked list, where the pose tracking information includes the first photographing pose, the second photographing pose, a tolerance of the photographing poses and the overlap between the images.

In an embodiment of the disclosure, the modules further include a path refinement module. The path refinement module divides each move of the electronic apparatus into a plurality of small moves, and retrieves a small displacement and a small angular displacement detected by the sensing unit in each small move, and integrates the small displacement and the small angular displacement detected by the sensing unit in each small move to estimate a moving path of the electronic apparatus in a 3D space and the photographing pose of the electronic apparatus when the image capturing unit captures each image.

In an embodiment of the disclosure, the modules further include an image sorting module. Each time when the electronic apparatus captures a new image of the 3D object by the image capturing unit, the image sorting module finds a plurality of images with the closest pose tracking information from the linked list, and adds a node to the linked list to insert the new image and corresponding pose tracking information between the images or in front of or behind one of the images.

In an embodiment of the disclosure, the modules further include a surface creating module, a projection module, a searching module and a directing module. The surface creating module creates a surface enclosing the 3D object according to the circumference. The projection module respectively projects the images captured by the electronic apparatus onto the surface to identify a plurality of covered regions and a plurality of uncovered regions on the surface. The searching module searches the uncovered region with a shortest distance to a present position of the electronic apparatus, and estimates a photographing position used for capturing a new image of the uncovered region. The directing module calculates a moving direction and a moving distance of the electronic apparatus moving from the present position to the photographing position, and prompts the moving direction and the moving distance on a user interface of the electronic apparatus.

In an embodiment of the disclosure, the circumference estimating module further estimates a plurality of circumferences suitable for the electronic apparatus to capture the images of the 3D object to form a spherical surface enclosing the 3D object, and divides the circumferences into a plurality of the segments and provides the divided segments to the timer setting module for adjusting the timing interval of the timer.

According to the above descriptions, in the electronic apparatus and the method for incremental pose estimation and photographing thereof of the disclosure, at least two images of the 3D object at different positions encircling the 3D object are captured, so as to estimate the circumference suitable for capturing the images of the 3D object. The circumference is divided for adjusting the timing interval for capturing the images. According to the position and the pose that the user captures the images of the 3D object, a proper timing interval is calculated to automatically trigger the electronic apparatus to capture the images, so as to assist the user in capturing the images of the 3D object for reconstructing a complete 3D object.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
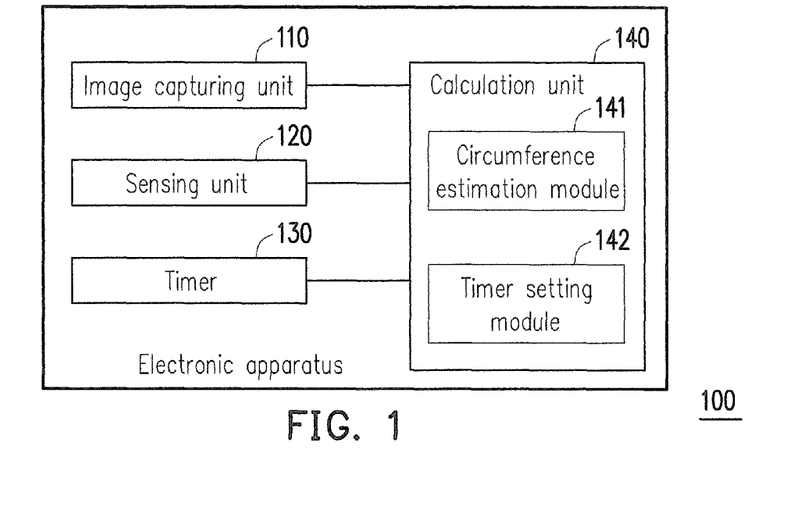
FIG. 1 is a block diagram of an electronic apparatus according to an embodiment of the disclosure.

FIG. 1 is a block diagram of an electronic apparatus according to an embodiment of the disclosure. Referring to FIG. 1, in the present embodiment, the electronic apparatus 100 is, for example, a digital camera, a smart phone, a tablet PC, or other handheld devices having an image capturing function, which is not limited by the disclosure. The electronic apparatus 100 includes an image capturing unit 110, a sensing unit 120, a timer 130 and a calculation unit 140. Functions of the above devices are described below.

The image capturing unit 110 is, for example, a device containing an optical prime lens or an optical zoom lens, and a photosensitive element such as a charge coupled device (CCD) or a complementary metal-oxide semiconductor (CMOS) device. In the present embodiment, the image capturing unit 110 can adjust a focal length to capture images of a 3D object at different positions encircling the 3D object.

The sensing unit 120 is, for example, a sensor such as a G-sensor, a gyroscope, an accelerometer or an E-compass, or a combination thereof, which can be used for detecting displacements and angular displacements of the electronic apparatus 100 when the image capturing unit 110 captures the images of the 3D object.

The calculation unit 140 is coupled to the image capturing unit 110, the sensing unit 120 and the timer 130, and the calculation unit 140 is, for example, a central processing unit (CPU) having a single core or multiple cores, or a programmable general purpose or special purpose microprocessor, a digital signal processor (DSP), a programmable controller, an application specific integrated circuit (ASIC) or other similar devices or a combination of the above devices. In the present embodiment, the calculation unit 140 can be used to execute a circumference estimation module 141 and a timer setting module 142 to execute a method for incremental pose estimation and photographing of the disclosure.

Figure 2A:
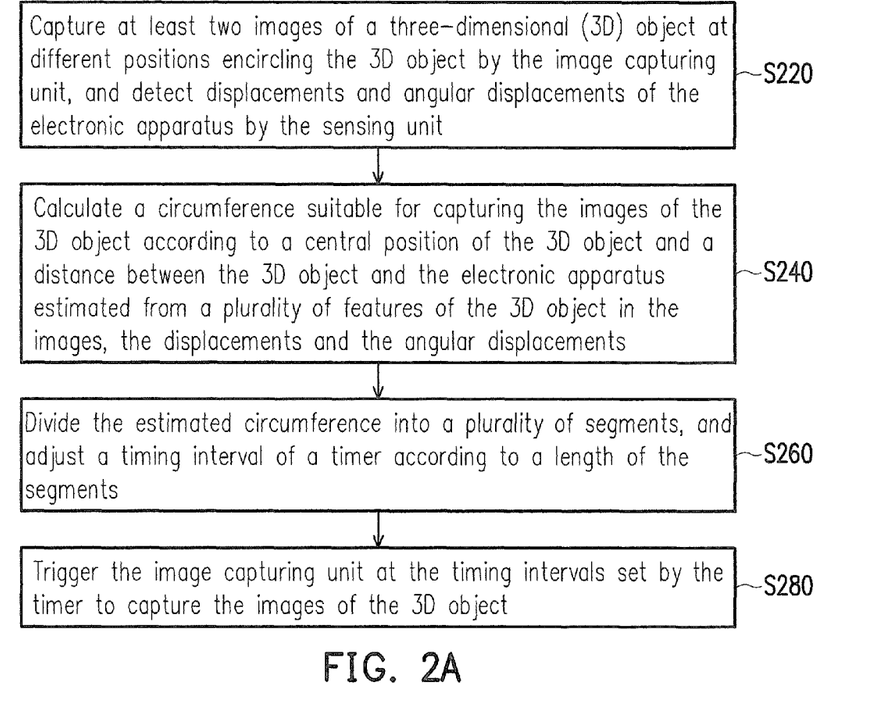
FIG. 2A is a flowchart illustrating a method for incremental pose estimation and photographing according to an embodiment of the disclosure.

In detail, FIG. 2A is a flowchart illustrating a method for incremental pose estimation and photographing according to an embodiment of the disclosure. Referring to FIG. 1 and FIG. 2A, the method of the present embodiment is adapted for the electronic apparatus 100, and detailed steps of the method for incremental pose estimation and photographing of the present embodiment are described below with reference of various components of the electronic apparatus 100 of FIG. 1.

First, in step S220, the electronic apparatus 100 captures at least two images of a 3D object at different positions encircling the 3D object by the image capturing unit 110, and detects displacements and angular displacements of the electronic apparatus 100 by the sensing unit 120. The user may, for example, hold the electronic apparatus 100 to walk around the 3D object and capture the images of the 3D object, and the electronic apparatus 100 may use the sensing unit 120 to detect the displacements and the angular displacements of the electronic apparatus 100 during an image capturing process, and uses the detected displacements and angular displacements for subsequent pose estimation.

In step S240, a circumference suitable for capturing the images of the 3D object is calculated by the circumference estimation module 141 according to a central position of the 3D object and a distance between the 3D object and the electronic apparatus 100 estimated from a plurality of features of the 3D object in the images, the displacements and the angular displacements.

Figure 2B:
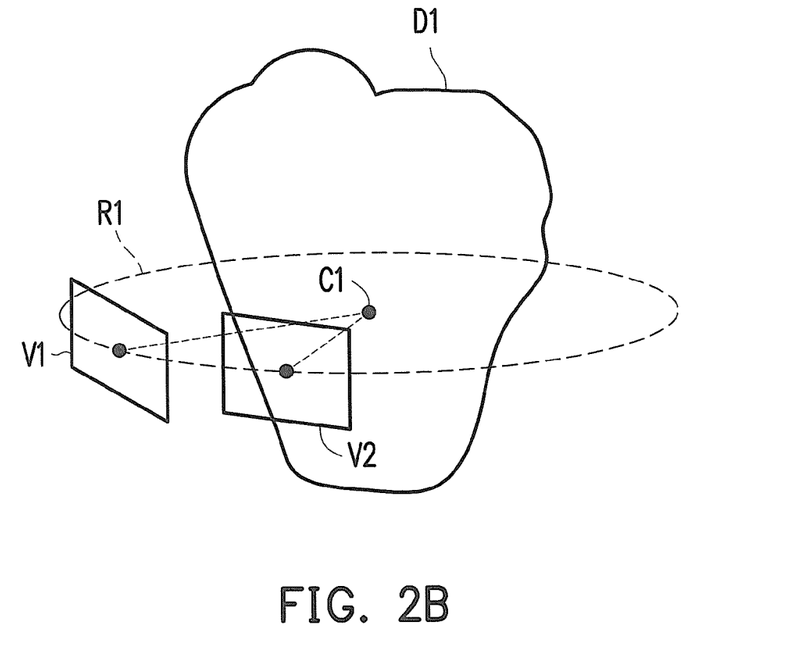
FIG. 2B is a schematic diagram of capturing images of a 3D object according to an embodiment of the disclosure.

For example, FIG. 2B is a schematic diagram of capturing images of a 3D object according to an embodiment of the disclosure. In the present embodiment, an electronic apparatus respectively captures images of a 3D object D1 at a photographing position V1 and a photographing position V2 encircling the 3D object D1, and detects a displacement and an angular displacement of the electronic apparatus when moving from the photographing position V1 to the photographing position V2. The electronic apparatus can determine whether the captured images have overlap or not. If the two images have overlap, the two images can be used to calculate a center of the photographed 3D object D1 and a distance between the 3D object D1 and the electronic apparatus. If the two images are not overlapped to each other due to an excessive distance between different photographing positions or an excessive difference between photographing angles according to the detected displacement and angular displacement, the above calculation is not performed.

According to the images captured at the photographing position V1 and the photographing position V2, and the displacement and the angular displacement of the electronic apparatus detected when moving from the photographing position V1 to the photographing position V2, the electronic apparatus can estimate a central position C1 of the 3D object D1. In detail, the electronic apparatus can calculate distances between the photographing position V1, the photographing position V2 and the 3D object D1 according to focal lengths of the captured images or other photographing information, and can obtain a distance between the photographing position V1 and the photographing position V2 according to the detected displacement and angular displacement. In this way, the central position C1 can be estimated through a simple triangulation method. A circumference R1 suitable for capturing the images of the 3D object D1 can be estimated according to the distances between the photographing position V1, the photographing position V2 and the 3D object D1, and each point on the circumference R1 is a position suitable for capturing the image of the 3D object D1.

Referring back to the flow of FIG. 2A, in step S260, the timer setting module 142 divides the circumference estimated by the circumference estimating module 141 into a plurality of segments, and adjusts a timing interval of the timer 130 according to a length of the segments. In an embodiment, the circumference estimating module 141 can only estimate the circumference on a horizontal plane where the electronic apparatus 100 is located, and the timer setting module 142 divides the circumference into a plurality of segments to calculate the timing interval of the timer. In another embodiment, the circumference estimating module 141 can also estimate a plurality of circumferences (for example, circumferences encircling an upper part, a middle part and a lower part of the 3D object D1) that are suitable for the electronic apparatus 100 to capture the images of the 3D object D1, where the circumferences can form a spherical surface enclosing the 3D object D1, and these circumferences can be respectively divided into a plurality of segments of different numbers to facilitate calculating the timing interval of the timer 130. The number of the divided segments and the number of the estimated circumferences can be determined according to a size of the 3D object D1, which is not limited by the disclosure.

Figure 2C:
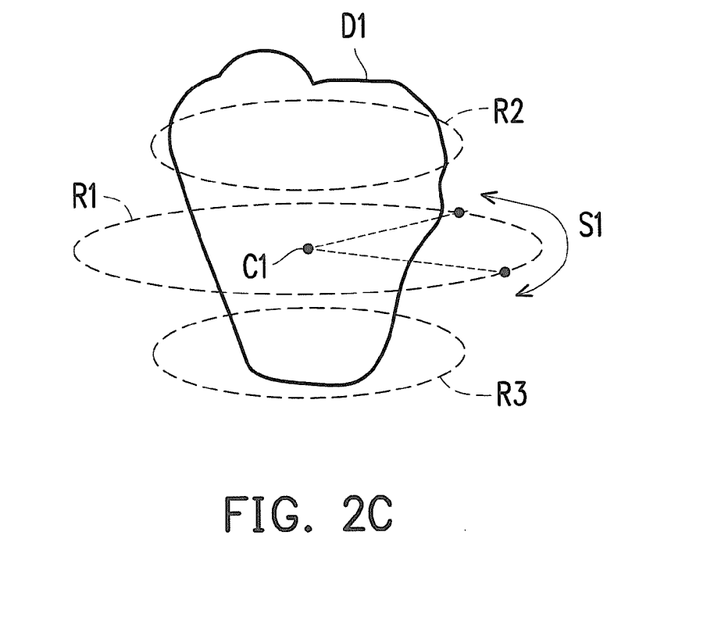
FIG. 2C is a schematic diagram of capturing images of a 3D object according to an embodiment of the disclosure.

For example, FIG. 2C is a schematic diagram of capturing images of the 3D object according to an embodiment of the disclosure. The present embodiment is an extension application of the embodiment of FIG. 2B, where the electronic apparatus further divides the estimated circumference R1 suitable for capturing the images of the 3D object D1 into a plurality of segments (for example, the segments S1) of a predetermined number (for example, 20), and adjusts the timing interval of the timer 130 according to a length of the segments. Particularly, in the present embodiment, besides the circumference R1 on the horizontal plane where the electronic apparatus is located, the circumference estimating module 141 can also respectively estimate circumferences R2 and R3 that are suitable for capturing the images of the 3D object D1 for an upper part and a lower part of the 3D object D1, and the timer setting module 142 divides the circumferences R2 and R3 into a plurality of segments of a predetermined number (for example, 10), and adjusts the timing interval of the timer 130 according to a length of the segments. Taking the embodiment of FIG. 2C as an example, capturing the images of the 3D object D1 along the circumferences R1, R2 and R3 can fill holes at a top part and a bottom part of the 3D object D1 caused by photographing only along the circumference R1.

It should be noticed that in the above step S260, the timer setting module 142 divides the circumference estimated by the circumference estimation module 141 into a plurality of segments of a predetermined number, and adjusts the timing interval of the timer 130 according to the length of the segments. However, in another embodiment, the timer setting module 142 can divide the circumference according to a displacement of the electronic apparatus 100 when capturing the images. The timer setting module 142 may take an average displacement, a minimum displacement or a maximum displacement of the electronic apparatus 100 when capturing the images as a length to divide the circumference into a plurality of segments. In this way, the timing interval set by the timer setting module 142 can be complied with a moving speed of the electronic apparatus 100 to capture the images of the 3D object, so that the image capturing unit 110 is triggered to capture the images at proper timing.

Referring back to FIG. 2A, in step S280, according to the timing interval adjusted by the circumference estimation module 141, the image capturing unit 110 is triggered at intervals set by the timer 130 to capture the images of the 3D object.

The electronic apparatus 100 can automatically capture the images of the 3D object through automatic trigger of the timer 130 when moving by a certain distance. The user is only required to hold the electronic apparatus 100 to move around the 3D object, and the electronic apparatus 100 can automatically capture all the images required for reconstructing the 3D object. A failed reconstruction due to excessive moving distance causing non-overlap between images is also avoided. This way improves the convenience of the operation and enhances the integrity of the constructed 3D object.

It should be noticed that since the user is unnecessary to move along a fixed (i.e. the circumference) path when capturing the images of the 3D object, a variety of situations may be encountered such as the user approaches to the 3D object, moves away from the 3D object, changes a moving direction, or changes a moving speed. The above situations probably cause a change of the distance between the electronic apparatus 100 and the 3D object and cause a change of the circumference suitable for capturing the images of the 3D object. Therefore, it is necessary to re-estimate the circumference of the 3D object to adjust the timing interval of the timer 130. In this case, the disclosure provides many auxiliary determination methods to assist the electronic apparatus 100 in re-estimating the central position and the circumference of the 3D object.

In case that the user approaches or moves away from the 3D object, the circumference estimation module 141 analyzes the new image and the previously captured image to re-estimate the central position and the circumference of the 3D object. In an embodiment, the timer setting module 142 compares the central position re-estimated by the circumference estimation module 141 with the previously estimated central position to determine whether a difference therebetween exceeds a predetermined ratio (for example, 10%). Once the difference exceeds the predetermined ratio, it represents that the previously estimated circumference is not applicable, and accordingly the timer setting module 142 adjusts the timing interval of the timer 130 according to the circumference re-estimated by the circumference estimation module 141. In another embodiment, the timer setting module 142 can directly compare the circumference re-estimated by the circumference estimation module 141 with the previously estimated circumference to determine whether a difference therebetween exceeds a predetermined ratio (for example, 10%). Once the difference exceeds the predetermined ratio, it represents that the previously estimated circumference is not applicable, and accordingly the timer setting module 142 adjusts the timing interval of the timer 130 according to the re-estimated circumference.

In brief, the electronic apparatus 100 can modify the previously estimated circumference through further analysis, and adjust the timer 130 to update the timing interval. It is assumed that when the user uses the electronic apparatus 100 to capture the images, the user deviates from the path (i.e. the circumference) originally estimated by the circumference estimation module 141, the electronic apparatus 100 can re-estimate the circumference to update the timing interval. The timing for the electronic apparatus 100 to update the timing interval can be determined at least according to whether the central position or the circumference is shifted.

On the other hand, in case that the user changes a moving direction and/or a moving speed, since it may cause a result that the subsequently captured image and the previously captured image are discontinuous or have no overlap therebetween, the disclosure also provides a pose tracking method to compare the subsequently captured image and the previously captured image by estimating a photographing pose of each image, so as to find an order and correlation between the subsequently captured image and the previously captured image to facilitate subsequent reconstruction of the 3D object.

Figure 3:
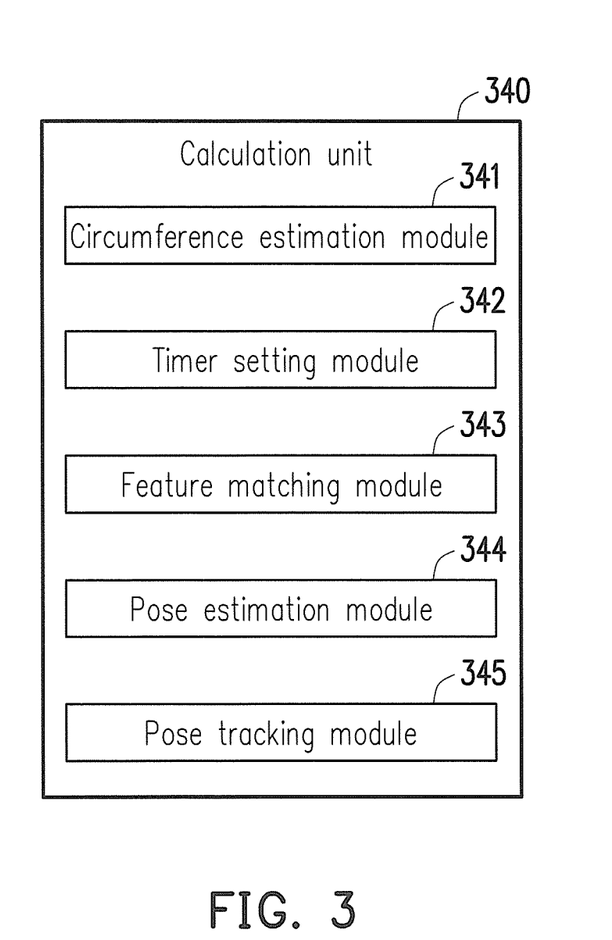
FIG. 3 is a block diagram of a calculation unit of an electronic apparatus according to an embodiment of the disclosure.

For example, referring to FIG. 3, FIG. 3 is a block diagram of a calculation unit of the electronic apparatus according to an embodiment of the disclosure. Besides a circumference estimation module 341 and a timer setting module 342, the calculation unit 340 of the present embodiment further includes a feature matching module 343, a pose estimation module 344 and a pose tracking module 345. Functions of the circumference estimation module 341 and the timer setting module 342 are the same as or similar to those of the circumference estimation module 141 and the timer setting module 142 of the embodiment of FIG. 1, and details thereof are not repeated. The calculation unit 340 of the present embodiment can be applied to the electronic apparatus 100.

Figure 4:
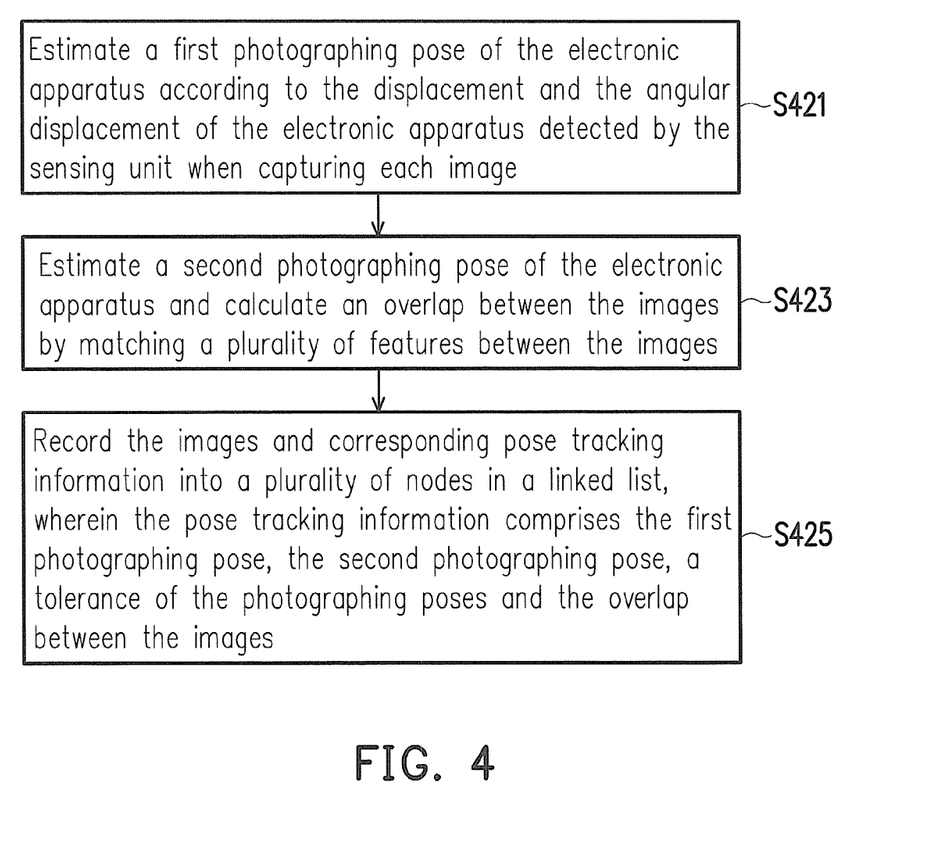
FIG. 4 is a flowchart illustrating a method for incremental pose estimation and photographing according to an embodiment of the disclosure.

FIG. 4 is a flowchart illustrating a method for incremental pose estimation and photographing according to an embodiment of the disclosure. The steps of the present embodiment are subsequent to the step S220 of the embodiment of FIG. 2A. With reference of FIG. 2A to FIG. 4, after the sensing unit 120 detects the displacements and the angular displacements of the electronic apparatus 100 when the image capturing unit 110 captures the images, in step S421, the pose estimation module 344 estimates a first photographing pose of the electronic apparatus 100 according to the detected displacements and the angular displacements. In step S423, the pose estimation module 344 estimates a second photographing pose of the electronic apparatus 100 according to the features matched by the feature matching module 343. The first photographing pose and the second photographing pose may include a position, a pose of the electronic apparatus 100 in a 3D space, a relative position and a relative angle between the electronic apparatus 100 and the 3D object, etc., which is not limited by the disclosure. In the disclosure, the photographing pose estimated by data measured by the sensor and the photographing pose estimated by processing the images can be combined to obtain a more accurate pose estimation result.

In step S425, the pose tracking module 345 records the images and pose tracking information thereof into a plurality of nodes in a linked list. The pose tracking information includes the first photographing pose, the second photographing pose, a tolerance of the photographing poses and the overlap between the images.

It should be noticed that the electronic apparatus 100 of the present embodiment may use a suitable linked list according to different requirements for recording images and information, for example, a singly linked list, a doubly linked list and a circular linked list. The linked list has a plurality of nodes, and each node may store variables of data, and has an indicator pointed to each other, for example, the singly linked list has single direction indicators, the doubly linked list has bi-direction indicators, and the circular linked has a last node being redirected to a first node to form a loop. Taking the pose tracking information to be recorded as an example, after the pose estimation module 344 estimates the first photographing pose of the electronic apparatus 100 according to the displacement and the angular displacement, the first photographing pose can be stored to the node. After the feature matching module 343 extracts the features of the images for matching, the estimated second photographing pose can also be stored to the node, and the first photographing pose and the second photographing pose are correlated with each other due to a characteristic of the linked list. Moreover, the feature matching module 343 can estimate whether the new image is located between the two images or in front of or behind one of the images by calculating the overlap between the images, and then stores the new image and related information into the node. The electronic apparatus 100 can set a tolerance of ±15% between the two photographing poses to avoid small overlap.

It should be noticed that during the process of reconstructing the 3D object, the user is required to hold and move the electronic apparatus 100 to capture images. Each time when the electronic apparatus 100 detects valid displacements and angular displacements by the sensing unit, the electronic apparatus 100 integrates the displacements and the angular displacements detected by the sensing unit 120 to calculate a total displacement and a total angular displacement of the move. However, if rotation is not considered during the integration, when calculating a real moving path of the electronic apparatus 100, it is unable to obtain a correct path by directly accumulating the displacements and the angular displacements.

Figure 5:
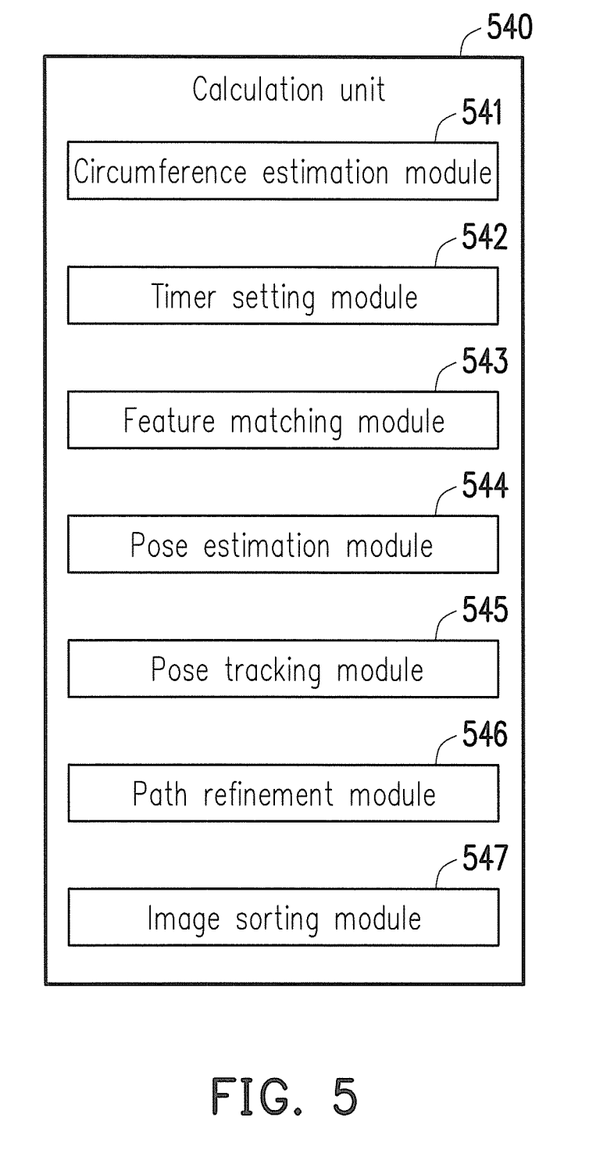
FIG. 5 is a block diagram of a calculation unit of an electronic apparatus according to an embodiment of the disclosure.

The above problem is due to treating the continuous movement of the electronic apparatus 100 as discrete movement. From a micro view, each move of the electronic apparatus 100 contains rotation. Therefore, the disclosure provides a method for refining the calculated path. FIG. 5 is a block diagram of a calculation unit of the electronic apparatus according to an embodiment of the disclosure. Besides a circumference estimation module 541, a timer setting module 542, a feature matching module 543, a pose estimation module 544 and a pose tracking module 545, the calculation unit 540 of the present embodiment further includes a path refinement module 546 and an image sorting module 547. Functions of the circumference estimation module 541, the timer setting module 542, the feature matching module 543, the pose estimation module 544 and the pose tracking module 545 are the same as or similar to those of the circumference estimation module 341, the timer setting module 342, the feature matching module 343, the pose estimation module 344 and the pose tracking module 345 of the aforementioned embodiment, and details thereof are not repeated. Similarly, the calculation unit 540 can be applied to the electronic apparatus 100.

Figure 6:
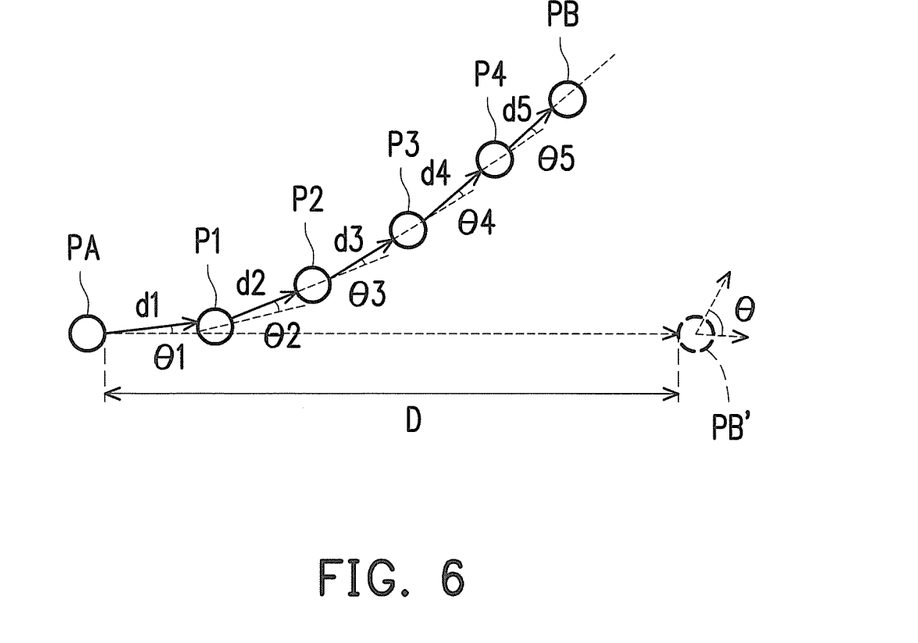
FIG. 6 is schematic diagram of a path refinement method according to an embodiment of the disclosure.

Referring to FIG. 5 and FIG. 6, FIG. 6 is schematic diagram of a path refinement method according to an embodiment of the disclosure. When the electronic apparatus 100 is moved from a position PA to a position PB, an incorrect position PB' is obtained if a displacement D and an angular displacement θ detected by the sensing unit 120 are directly used for calculation. In the present embodiment, the path refinement module 546, for example, divides the move of the electronic apparatus 100 into five small moves respectively comprising five small displacements d1, d2, d3, d4, d5 and five small angular displacements θ1, θ2, θ3, θ4, θ5, and integrates the small displacements d1-d5 and the small angular displacements θ1-θ5 to obtain positions P1, P2, P3, P4 and PB after the five small moves. In this way, the pose estimation module 544 obtains a more accurate position PB. The number of small moves divided by the path refinement module 546 is not limited by the disclosure, and the number can be a system pre-setting or can be adjusted by the user.

It should be noticed that in the present embodiment, the moves of the electronic apparatus 100 is regarded as continuous and rotation angles in the moves are considered. From a micro view, the path refinement module 546 of the present embodiment divides each move into a plurality of small moves, where the small displacement generated by each small move can be calculated by an accelerometer, and the corresponding small angular displacement can be calculated by a gyroscope. Since a sampling speed of the above sensor is very high (which can be 100 times/second), the five small displacements d1-d5 can all be regarded as straight line motions, and the corresponding small angular displacements θ1-θ5 are respectively used to rotate a start direction of a next move, so as to obtain a more accurate moving path (i.e. from the position PA to the position PB).

It should be noticed that the path refinement module 546 directly updates the path after each calculation, such that an extra memory is no longer required to temporarily store a previous calculation result when calculating the total displacement. According to the above calculation method, a complete path can be accurately calculated without a large deviation.

Referring back to the flow of FIG. 4, in order to avoid incomplete construction of the 3D object caused by the hand-held motion error, the image sorting module 547 searches a plurality of images with the closest pose tracking information from the linked list, and adds a node to the linked list to insert the new image and the related pose tracking information between two images or in front of or behind one of the images. The new image is, for example, stored in the new node, and a pointing relationship of the linked list is used to set an order of each node. In the present embodiment, the image sorting module 547 can retain or place the image with the excessively large difference in a last position of the linked list. In detail, during the image capturing process, the image sorting module 547 compares, inserts and records the new image to ensure the new image is accommodated in a proper position among all of the images.

On the other hand, to construct a complete 3D object, a plurality of images with different angles within 360 degrees encircling the 3D object are required, and since the user does not know the images of which angles are lacked to reconstruct the complete 3D object during the image capturing process, in the disclosure, the existing images and the known information such as photographing poses are combined to further estimate the images of other angles that are not obtained but required for reconstructing the 3D object, and through prompting of the electronic apparatus 100, the user is guided to the proper positions to capture the images, so as to obtain the images of all of the required angles for reconstructing the 3D object.

Figure 7:
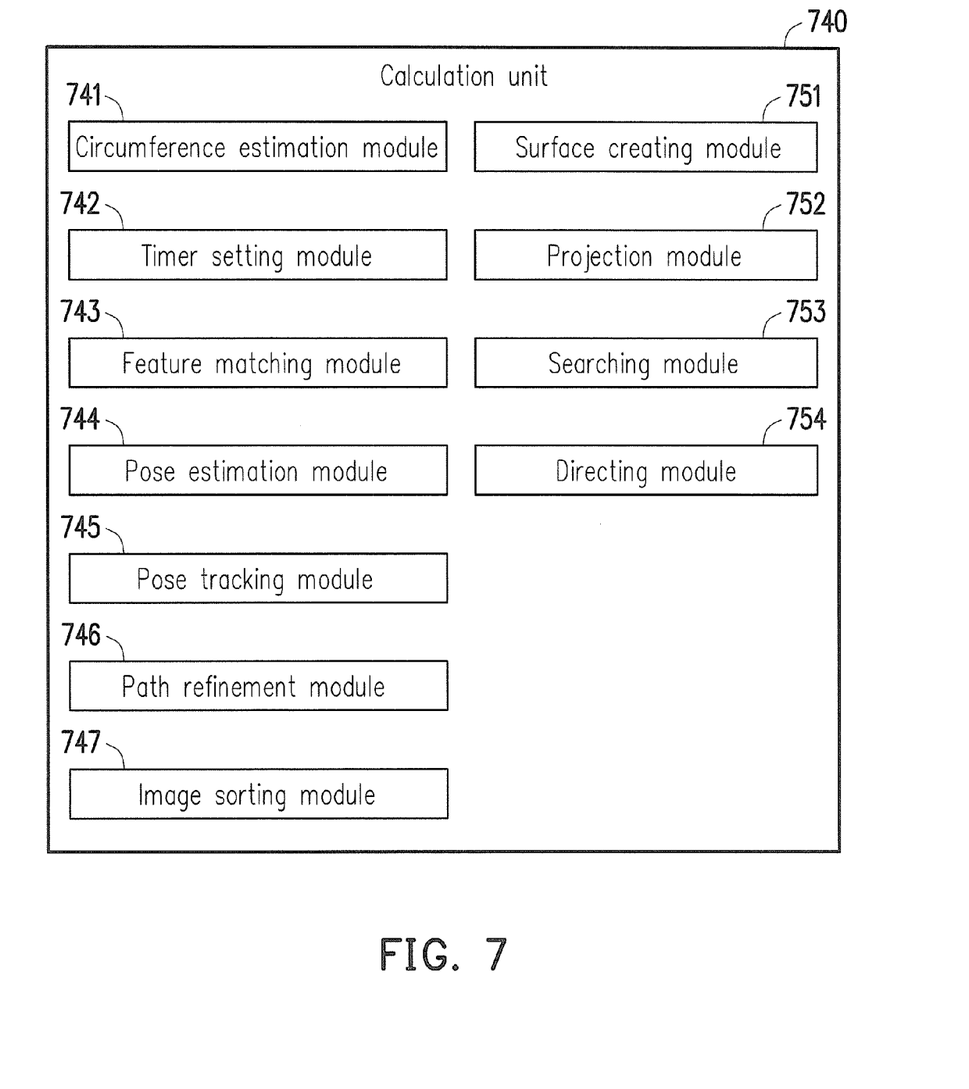
FIG. 7 is a block diagram of a calculation unit of an electronic apparatus according to an embodiment of the disclosure.

Referring to FIG. 7, FIG. 7 is a block diagram of a calculation unit of the electronic apparatus according to an embodiment of the disclosure. Besides a circumference estimation module 741, a timer setting module 742, a feature matching module 743, a pose estimation module 744 and a pose tracking module 745, a path refinement module 746 and an image sorting module 747, the calculation unit 740 of the present embodiment further includes a surface creating module 751, a projection module 752, a searching module 753 and a directing module 754. Functions of the circumference estimation module 741, the timer setting module 742, the feature matching module 743, the pose estimation module 744, the pose tracking module 745, the path refinement module 746 and the image sorting module 747 are the same as or similar to those of the circumference estimation module 541, the timer setting module 542, the feature matching module 543, the pose estimation module 544, the pose tracking module 545, the path refinement module 546 and the image sorting module 547 of the aforementioned embodiment, and details thereof are not repeated. Similarly, the calculation unit 740 can be applied to the electronic apparatus 100.

Figure 8A:
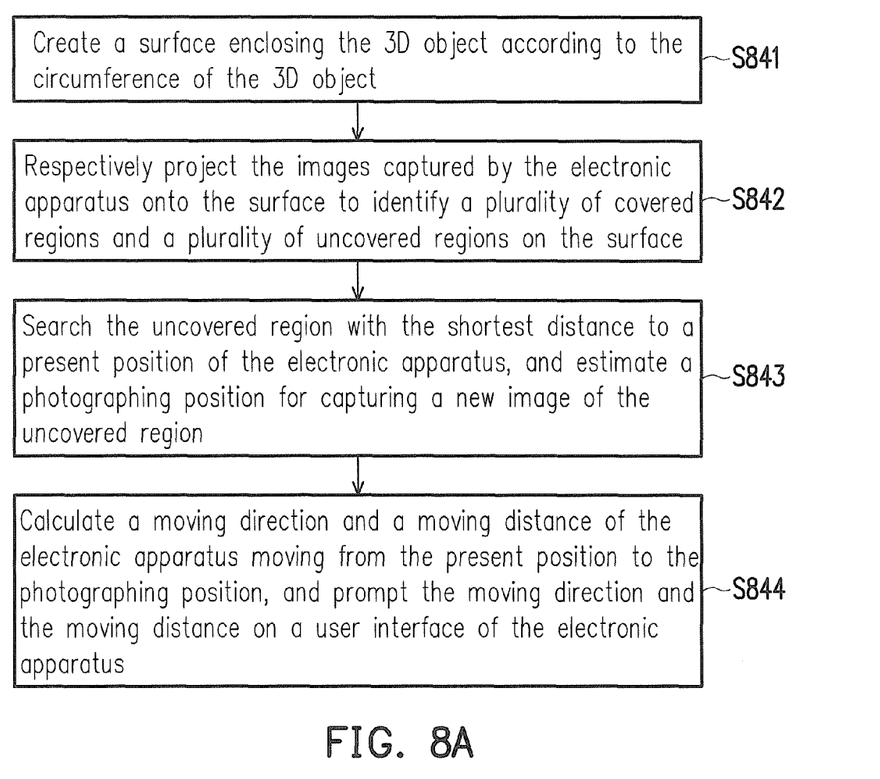
FIG. 8A is a flowchart illustrating a method for incremental pose estimation and photographing according to an embodiment of the disclosure.

Referring to FIG. 7 and FIG. 8A, FIG. 8A is a flowchart illustrating a method for incremental pose estimation and photographing. The steps of the present embodiment are, for example, subsequent to the step S240 of the embodiment of FIG. 2, i.e. after the circumference estimation module 141 estimates the circumference suitable for capturing the images of the 3D object. In step S841, the surface creating module 751 creates a surface enclosing the 3D object according to the circumference of the 3D object. The surface can be a surface of any object, for example, a surface of a cylinder, a sphere or a cube, etc., which is not limited by the disclosure.

In step S842, the projection module 752 respectively projects the images captured by the electronic apparatus 100 onto the surface of the 3D object to identify a plurality of covered regions and a plurality of uncovered regions on the surface. The projection module 752, for example, projects four corners of each image captured by the electronic apparatus 100 onto the surface to identify the covered regions and the uncovered regions on the surface.

In step S843, the searching module 753 searches the uncovered region with the shortest distance to a present position of the electronic apparatus 100, and estimates a photographing position for capturing a new image of the uncovered region. In detail, after the projection module 752 projects the images onto the surfaces created by the surface creation module 751, the searching module 753 can find the uncovered regions (i.e. the image of such angel is still required) from the surface, and searches the uncovered region with the shortest distance from all of the uncovered regions according to the present position of the electronic apparatus 100, so as to guide the user to move forward to the corresponding position to capture the image.

It should be noticed that in other embodiments, when the searching module 753 estimates the photographing position for capturing the new image of the uncovered region, the uncovered region overlapped to the covered region by a predetermined ratio is selected, such that the captured new image and the previously captured image are overlapped by the predetermined ratio. In this way, a relative position between the images can be learned according to the overlap, so as facilitate reconstructing the 3D object. For example, it is assumed that resolutions and sizes of the images captured by the image capturing unit 110 are all the same, and the user or the system can set the image to have the overlap with the predetermined ratio of 30%. In this way, all of the images captured by the electronic apparatus 100 have the overlap of 30%, which can serve for reconstructing the 3D object.

Figure 8B:
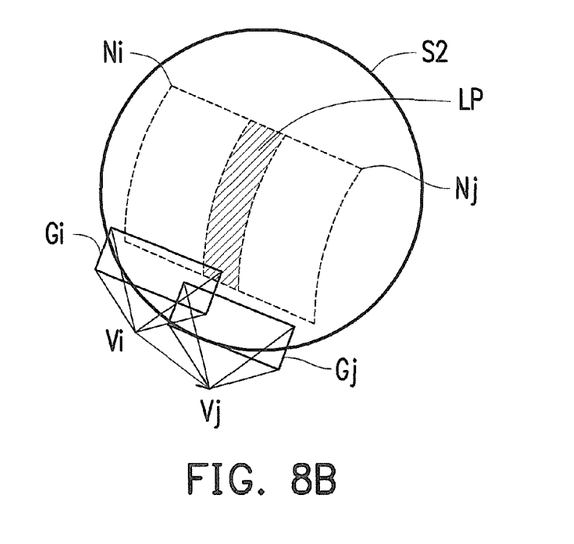
FIG. 8B is a schematic diagram of projecting images on a surface enclosing a 3D object to estimate a photographing position according to an embodiment of the disclosure.

For example, Referring to FIG. 8B, FIG. 8B is a schematic diagram of projecting images on a surface enclosing the 3D object to estimate a photographing position according to an embodiment of the disclosure. In the present embodiment, the surface S2 is a sphere enclosing the 3D object, and an image Gi is an image captured by the electronic apparatus at a photographing position Vi. A covered region Ni is obtained by projecting the image Gi onto the surface S2, and the electronic apparatus searches an adjacent uncovered region Nj from other uncovered regions except the covered region Ni from the surface S2, and accordingly estimates a photographing position Vj for capturing a new image Gj. Where, an overlap LP between the covered region Ni and the uncovered region Nj, for example, occupies 30% of the covered region Ni and the uncovered region Nj. Therefore, the new image Gj captured by the electronic apparatus at the photographing position Vj and the known image Gi are ensured to have the overlap of the predetermined ratio, such that the electronic apparatus can use the images Gi and Gj to reconstruct the 3D object later.

Referring back to the flow of FIG. 8A, in step S844, the directing module 754 calculates a moving direction and a moving distance of the electronic apparatus moving from the present position to the estimated photographing position of the new image, and prompts the same on a user interface of the electronic apparatus 100, so as to direct the user to move to the required position. A prompt method of the electronic apparatus 100 includes a text prompt, an image prompt, a voice prompt, etc., which is not limited by the disclosure. In this way, the user can quickly learn how to move to capture the shorted images required for reconstructing the 3D object according to the prompt of the electronic apparatus.

It should be noticed that each time the electronic apparatus 100 captures a new image of the uncovered region by the image capturing unit 110, the circumference estimation module 141, for example, re-estimates a new central position of the 3D object and a new distance between the 3D object and the electronic apparatus 100 by re-analyzing the images and the new image. The surface creating module 751 adjusts the surface enclosing the 3D object to a new surface according to the new central position and the new distance. Then, the projection module 752 re-projects the images captured by the electronic apparatus onto the new surface to identify the covered regions and the uncovered regions on the new surface, so as to implement the subsequent prompting. The above steps are repeated until the images captured by the electronic apparatus 100 fill the surface. In this way, the images captured by the electronic apparatus 100 are enough to reconstruct a complete 3D object.

In summary, in the electronic apparatus and the method for incremental pose estimation and photographing thereof of the disclosure, by estimating the circumference suitable for capturing the images of the 3D object, and dividing the circumference to estimate the timing interval suitable for capturing the images, the user is only required to hold the electronic apparatus and move around the 3D object, and the electronic apparatus can capture the images suitable for reconstructing the 3D image at proper time points. The disclosure further provides corresponding methods of pose tracking, image sorting, path refinement, photographing path guiding, etc. for a plurality of situations probably occurred when the user holds the electronic apparatus to capture the images of the 3D object. In this way, not only the user is assisted to capture the images of the 3D object, correctness and integrity of the captured images are ensured, so as to reconstruct a complete 3D object.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. A method for incremental pose estimation and photographing, adapted for an electronic apparatus having an image capturing device comprising a lens and a photosensitive element, a sensor, a timer and a calculation device, comprising:
  capturing at least two images of a three-dimensional (3D) object at different positions encircling the 3D object by the image capturing device, and detecting displacements and angular displacements of the electronic apparatus by the sensor;
  calculating a circumference suitable for capturing the images of the 3D object according to a central position of the 3D object and a distance between the 3D object and the electronic apparatus estimated from a plurality of features of the 3D object in the images, the displacements and the angular displacements by the calculation device which is coupled to the sensor;
  dividing the circumference into a plurality of segments, and adjusting a timing interval of the timer according to a length of the segments by the calculation device; and triggering the image capturing device at the timing intervals by the timer to capture the images of the 3D object.

2. The method for incremental pose estimation and photographing as claimed in claim 1, wherein after the step of triggering the image capturing device at the timing intervals by the timer, the method further comprises:

re-estimate the central position of the 3D object whenever a new image is captured by the image capturing device;

examining whether a difference between the re-estimated central position and the originally estimated central position exceeds a predetermined ratio; and adjusting the circumference and the timing interval of the timer according to the re-estimated central position if the difference exceeds the predetermined ratio.

3. The method for incremental pose estimation and photographing as claimed in claim 1, wherein after the step of triggering the image capturing device at the timing intervals by the timer, the method further comprises:

re-estimate the circumference of the 3D object whenever a new image is captured by the image capturing device;

examining whether a difference between the re-estimated circumference and the originally estimated circumference exceeds a predetermined ratio; and adjusting the timing interval of the timer according to the re-estimated circumference if the difference exceeds the predetermined ratio.

4. The method for incremental pose estimation and photographing as claimed in claim 1, wherein after the step of capturing the images of the 3D object at different positions encircling the 3D object by the image capturing device, and detecting the displacements and the angular displacements of the electronic apparatus by the sensor, the method further comprises:

estimating a first photographing pose of the electronic apparatus according to the displacement and the angular displacement of the electronic apparatus detected by the sensor when capturing each image;

estimating a second photographing pose of the electronic apparatus and calculating an overlap between the images by matching a plurality of features between images; and respectively recording the images and corresponding pose tracking information into a plurality of nodes in a linked list, wherein the pose tracking information comprises the first photographing pose, the second photographing pose, a tolerance of the photographing poses and the overlap between the images.

5. The method for incremental pose estimation and photographing as claimed in claim 4, wherein the step of estimating the photographing pose of the electronic apparatus comprises:

dividing each move of the electronic apparatus into a plurality of small moves, and retrieving a small displacement and a small angular displacement detected by the sensor in each small move of the electronic apparatus; and integrating the small displacement and the small angular displacement detected by the sensor in each small move to estimate a moving path of the electronic apparatus in a 3D space and the photographing pose of the electronic apparatus when capturing each image.

6. The method for incremental pose estimation and photographing as claimed in claim 5, wherein after the step of respectively recording the images and corresponding pose tracking information into the nodes in the linked list, the method further comprises:

finding a plurality of images with the closest pose tracking information from the linked list whenever the electronic apparatus captures a new image of the 3D object by the image capturing device, and adding a node to the linked list to insert the new image and corresponding pose tracking information between the images or in front of or behind one of the images.

7. The method for incremental pose estimation and photographing as claimed in claim 5, wherein after the step of estimating the circumference suitable for the electronic apparatus to capture the images of the 3D object, the method further comprises:

creating a surface enclosing the 3D object according to the circumference;

respectively projecting the images captured by the electronic apparatus onto the surface to identify a plurality of covered regions and a plurality of uncovered regions on the surface;

searching the uncovered region with a shortest distance to a present position of the electronic apparatus, and estimating a photographing position for capturing a new image of the uncovered region; and calculating a moving direction and a moving distance of the electronic apparatus moving from the present position to the photographing position, and prompting the moving direction and the moving distance on a user interface of the electronic apparatus.

8. The method for incremental pose estimation and photographing as claimed in claim 7, wherein the step of identifying the covered regions and the uncovered regions on the surface comprises:

respectively projecting four corners of each image captured by the electronic apparatus onto the surface to identify the covered regions and the uncovered regions on the surface.

9. The method for incremental pose estimation and photographing as claimed in claim 7, wherein after the step of prompting the moving direction and the moving distance on the user interface of the electronic apparatus, the method further comprises:

capturing the new image of the uncovered region by the image capturing device;

re-estimating a new central position of the 3D object and a new distance between the 3D object and the electronic apparatus by re-analyzing the images and the new image;

adjusting the surface enclosing the 3D object to a new surface according to the new central position and the new distance; and re-projecting the images captured by the electronic apparatus onto the new surface to identify the covered regions and the uncovered regions on the new surface.

10. The method for incremental pose estimation and photographing as claimed in claim 9, wherein the step of estimating the photographing position for capturing the new image of the uncovered region comprises:

estimating the photographing position for capturing the new image of the uncovered region to have an overlap of a predetermined ratio between the captured new image and the previously captured image.

11. The method for incremental pose estimation and photographing as claimed in claim 1, wherein the step of estimating the circumference suitable for the electronic apparatus to capture the images of the 3D object comprises:

estimating a plurality of circumferences suitable for the electronic apparatus to capture the images of the 3D object to form a spherical surface enclosing the 3D object, and dividing the circumferences into the segments for adjusting the timing interval of the timer.

12. The method for incremental pose estimation and photographing as claimed in claim 1, wherein the step of dividing the estimated circumference into the segments and adjusting the timing interval of the timer according to the length of the segments comprises:
dividing the estimated circumference into the segments according to a displacement of the electronic apparatus when capturing the images.

13. An electronic apparatus, comprising:
an image capturing device comprising a lens and a photosensitive element, capturing images of a 3D object at different positions encircling the 3D object;
a sensor, detecting displacements and angular displacements of the electronic apparatus when the image capturing device captures the images;
a timer, triggering the image capturing device to capture the images of the 3D object at timing intervals; and
a calculation device, coupled to the image capturing device, the sensor and the timer, executing a plurality of modules, wherein the modules comprise:
a circumference estimation module, calculating a circumference suitable for capturing the images of the 3D object according to a central position of the 3D object and a distance between the 3D object and the electronic apparatus estimated from a plurality of features of the 3D object in the images, the displacements and the angular displacements detected by the sensor; and
a timer setting module, dividing the circumference estimated by the circumference estimating module into a plurality of segments, and adjusting the timing interval of the timer according to a length of the segments.

14. The electronic apparatus as claimed in claim 13, wherein
after the timer triggers the image capturing device to capture a new image of the 3D object according to the adjusted timing interval, the circumference estimating module re-estimates the central position of the 3D object; and
the timer setting module adjusts the timing interval of the timer according to the re-estimated the central position if a difference between the re-estimated central position and the originally estimated central position exceeds a predetermined ratio.

15. The electronic apparatus as claimed in claim 13, wherein
after the timer triggers the image capturing device to capture a new image of the 3D object according to the adjusted timing interval, the circumference estimating module further re-estimates the circumference of the 3D object; and
the timer setting module adjusts the timing interval of the timer according to the re-estimated circumference if a difference between the re-estimated circumference and the originally estimated circumference exceeds a predetermined ratio.

16. The electronic apparatus as claimed in claim 13, wherein the modules further comprise:
a feature matching module, extracting and matching a plurality of features in the images to calculate overlaps between the images;
a pose estimation module, estimating a first photographing pose of the electronic apparatus according to the displacement and the angular displacement of the electronic apparatus detected by the sensor when capturing each image, and estimating a second photographing pose of the electronic apparatus according to the features matched by the feature matching module;
a pose tracking module, respectively recording the images and corresponding pose tracking information into a plurality of nodes in a linked list, wherein the pose tracking information comprises the first photographing pose, the second photographing pose, a tolerance of the photographing poses and the overlap between the images.

17. The electronic apparatus as claimed in claim 16, wherein the modules further comprise:
a path refinement module, dividing each move of the electronic apparatus into a plurality of small moves, retrieving a small displacement and a small angular displacement detected by the sensor in each small move, and integrating the small displacement and the small angular displacement detected by the sensor in each small move to estimate a moving path of the electronic apparatus in a 3D space and the photographing pose of the electronic apparatus when the image capturing device captures each image.

18. The electronic apparatus as claimed in claim 17, wherein the modules further comprise:
an image sorting module, finding a plurality of images with the closest pose tracking information from the linked list whenever the electronic apparatus captures a new image of the 3D object by the image capturing device, and adding a node to the linked list to insert the new image and corresponding pose tracking information between the images or in front of or behind one of the images.

19. The electronic apparatus as claimed in claim 17, wherein the modules further comprise:
a surface creating module, creating a surface enclosing the 3D object according to the circumference;
a projection module, respectively projecting the images captured by the electronic apparatus onto the surface to identify a plurality of covered regions and a plurality of uncovered regions on the surface;
a searching module, searching the uncovered region with a shortest distance to a present position of the electronic apparatus, and estimating a photographing position for capturing a new image of the uncovered region; and
a directing module, calculating a moving direction and a moving distance of the electronic apparatus moving from the present position to the photographing position, and prompting the moving direction and the moving distance on a user interface of the electronic apparatus.

20. The electronic apparatus as claimed in claim 19, wherein the circumference estimating module further estimates a plurality of circumferences suitable for the electronic apparatus to capture the images of the 3D object to form a spherical surface enclosing the 3D object, and dividing the circumferences into a plurality of segments and providing the divided segments to the timer setting module for adjusting the timing interval of the timer.

* * * * *